US012429203B2

(12) United States Patent
Motegi et al.

(10) Patent No.: US 12,429,203 B2
(45) Date of Patent: Sep. 30, 2025

(54) LIGHT SOURCE DEVICE

(71) Applicant: Panasonic Intellectual Property Management Co., Ltd., Osaka (JP)

(72) Inventors: Shogo Motegi, Osaka (JP); Shintaro Hayashi, Hyogo (JP); Toshiaki Takenaka, Osaka (JP); Fumiya Yagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 10 days.

(21) Appl. No.: 18/283,170

(22) PCT Filed: Dec. 7, 2021

(86) PCT No.: PCT/JP2021/044909
§ 371 (c)(1),
(2) Date: Sep. 20, 2023

(87) PCT Pub. No.: WO2022/201653
PCT Pub. Date: Sep. 29, 2022

(65) Prior Publication Data

US 2024/0167672 A1 May 23, 2024

(30) Foreign Application Priority Data

Mar. 26, 2021 (JP) ................................ 2021-054357

(51) Int. Cl.

| | |
|---|---|
| ***H05B 45/12*** | (2020.01) |
| ***F21V 5/04*** | (2006.01) |
| ***F21V 9/32*** | (2018.01) |
| ***F21V 23/04*** | (2006.01) |
| ***F21V 25/10*** | (2006.01) |
| ***H05B 45/50*** | (2022.01) |

(52) U.S. Cl.
CPC .......... *F21V 23/0457* (2013.01); *F21V 5/048* (2013.01); *F21V 9/32* (2018.02);
(Continued)

(58) Field of Classification Search
CPC ........ F21V 23/0457; F21V 9/32; F21V 5/048; F21V 25/10; H05B 45/50; H05B 45/12
See application file for complete search history.

(56) References Cited

U.S. PATENT DOCUMENTS

| | | | | |
|---|---|---|---|---|
| 7,049,622 B1 * | 5/2006 | Weiss .................... | G01F 23/292 73/290 R |
| 2010/0110533 A1 * | 5/2010 | Kusukame ............ | G02F 1/3544 359/326 |

(Continued)

FOREIGN PATENT DOCUMENTS

| | | |
|---|---|---|
| JP | 2008-301874 | 12/2008 |
| JP | 2012-216299 | 11/2012 |

(Continued)

OTHER PUBLICATIONS

International Search Report issued in International Patent Application No. PCT/JP2021/044909, dated Jan. 18, 2022.

*Primary Examiner* — Henry Luong
(74) *Attorney, Agent, or Firm* — GREENBLUM & BERNSTEIN, P.L.C.

(57) ABSTRACT

The light source device includes at least one excitation light source which emits primary light, a light conversion member which emits secondary light that contains the primary light and wavelength-converted light obtained by converting a wavelength of at least part of the primary light, a sensor which detects the primary light and the wavelength-converted light, and a controller which obtains a first signal which is a signal indicating the detected primary light and a second signal indicating the wavelength-converted light detected by the sensor. The controller determines an operation safety parameter based on a ratio of an output value of the first signal to an output value of the second signal, and controls the at least one excitation light source based on the operation safety parameter with respect to a predetermined
(Continued)

1/6 threshold or an amount of change of the operation safety parameter from that during normal operation.

8 Claims, 6 Drawing Sheets

(52) U.S. Cl.
CPC ............ *F21V 25/10* (2013.01); *H05B 45/12* (2020.01); *H05B 45/50* (2020.01)

(56) References Cited

U.S. PATENT DOCUMENTS

| | | | | |
|---|---|---|---|---|
| 2011/0116520 | A1 | 5/2011 | Carolus et al. | |
| 2014/0016345 | A1* | 1/2014 | Nishio | G02B 6/0006<br>362/581 |
| 2014/0286365 | A1* | 9/2014 | Ishikawa | H05B 47/00<br>372/29.01 |
| 2015/0205190 | A1 | 7/2015 | Fukami et al. | |
| 2019/0032907 | A1 | 1/2019 | Kuribayashi et al. | |
| 2019/0097095 | A1 | 3/2019 | Yamanaka et al. | |

FOREIGN PATENT DOCUMENTS

| | | |
|---|---|---|
| JP | 2014-235323 | 12/2014 |
| JP | 5677293 | 2/2015 |
| JP | 2015-138045 | 7/2015 |
| JP | 2019-29477 | 2/2019 |
| WO | 2010/004477 | 1/2010 |
| WO | 2017/195620 | 11/2017 |

* cited by examiner

LIGHT SOURCE DEVICE

TECHNICAL FIELD

The present disclosure relates to a light source device.

BACKGROUND ART

Patent Literature (PTL) 1 discloses a laser device which emits laser light, a light conversion device which converts the laser light to yellow light, a beam splitter which directs the yellow light generated by the light conversion device to a converted-light sensor, and the converted-light sensor which measures light output reflected from the beam splitter.

CITATION LIST

Patent Literature

[PTL 1] Japanese Patent No. 5677293

SUMMARY OF INVENTION

Technical Problem

In traditional light source devices, light obtained by converting the wavelength by a wavelength converting member as a light conversion device is reflected by a beam splitter and directed to a sensor. Thus, precision of detection by the sensor can be ensured by ensuring light convergence efficiency of the sensor. However, such a configuration of the traditional light source devices cannot precisely detect small breakage in terms of the time derivative value of the amount of change in the output signal of the sensor.

Thus, an object of the present disclosure is to provide a light source device which can precisely detect small breakage of a light conversion member.

Solution to Problem

The light source device according to one aspect of the present disclosure includes at least one excitation light source that emits primary light; a light conversion member that emits secondary light that contains the primary light and wavelength-converted light obtained by converting a wavelength of at least part of the primary light; a sensor that detects the primary light and the wavelength-converted light; and a controller that obtains a first signal that is a signal indicating the primary light detected by the sensor, and a second signal that is a signal indicating the wavelength-converted light detected by the sensor. Here, the controller determines an operation safety parameter based on a ratio of an output value of the first signal to an output value of the second signal; and controls the at least one excitation light source based on the operation safety parameter with respect to a predetermined threshold or an amount of change of the operation safety parameter from an operation safety parameter during normal operation.

Advantageous Effects of Invention

The light source device according to the present disclosure can precisely detect small breakage of a light conversion member.

DESCRIPTION OF EMBODIMENTS

Figure 1:
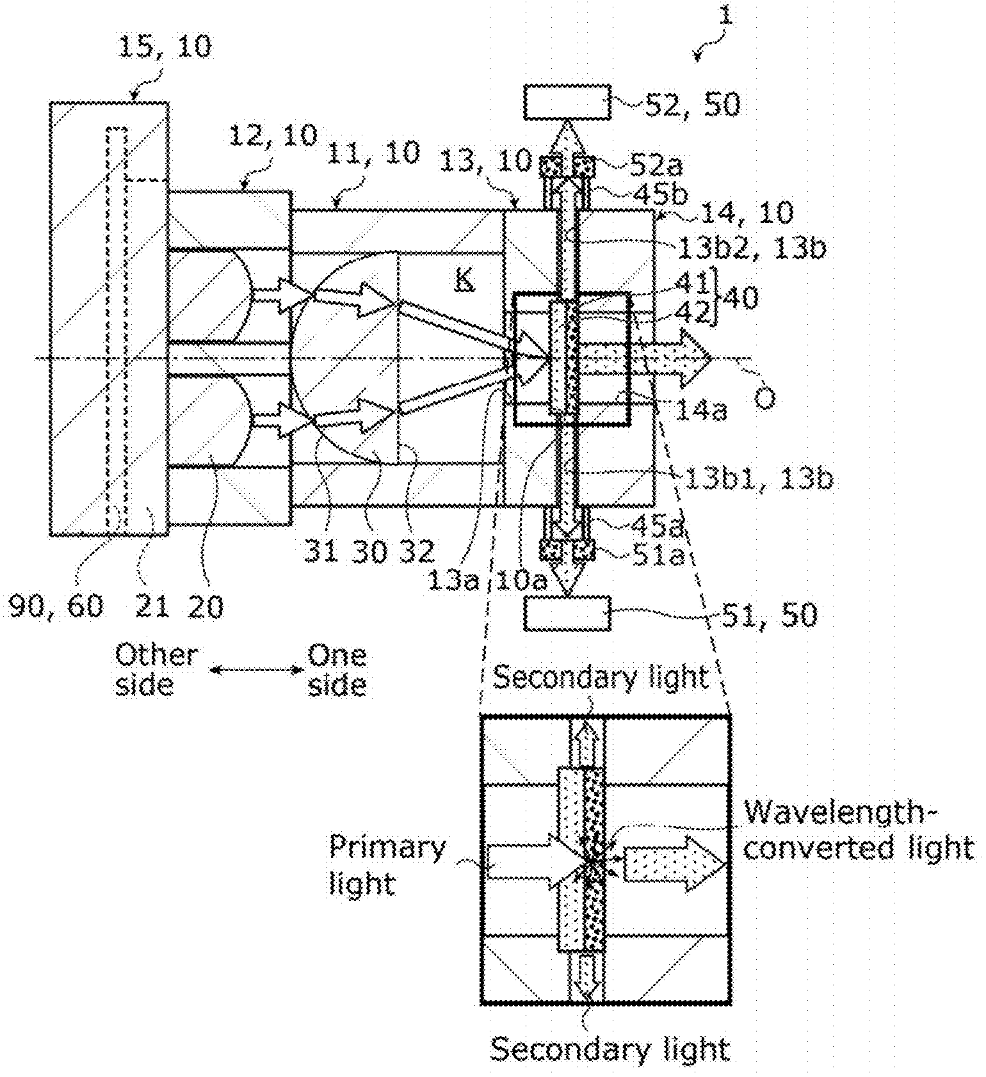
FIG. 1 is a cross-sectional view illustrating a light source device according to an embodiment.

Hereinafter, an embodiment according to the present disclosure will be described with reference to the drawings. The embodiment described below illustrates preferred specific examples of the present disclosure. Therefore, numeric values, shapes, materials, components, arrangement positions of components, connection forms thereof, and the like shown in the embodiment below are exemplary, and should not be construed as limitations to the present disclosure. Accordingly, among the components shown in the embodiment below, the components not described in an independent claim will be described as optional components.

The drawings are schematic views, and are not necessarily precise illustrations. In the drawings, identical referential numerals are given to identical constitutional components.

In the embodiment below, expressions such as "approximately parallel" are used. For example, the expression "approximately parallel" means not only completely parallel, but also substantially parallel, namely, containing an error of about several percent. The expression "approximately parallel" means parallel in the range enabling the effects of the present disclosure to be obtained. The same is applied to other expressions using "approximately".

In the embodiment shown below, the fluorescent member side with respect to the excitation light source is defined as one side, and the excitation light source side with respect to the fluorescent member is defined as the other side.

Hereinafter, a light source device according to an embodiment of the present disclosure will be described.

Embodiment

<Configuration: Light Source Device 1>

Figure 2:
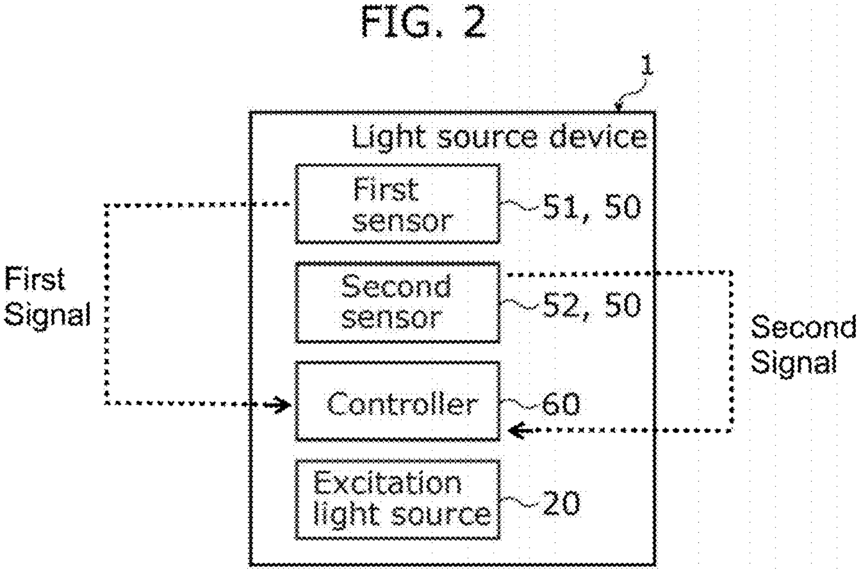
FIG. 2 is a block diagram illustrating the light source device according to the embodiment.

FIG. 1 is a cross-sectional view illustrating light source device 1 according to an embodiment. FIG. 2 is a block diagram illustrating light source device 1 according to the embodiment.

As illustrated in FIGS. 1 and 2, light source device 1 is a lighting device which emits primary light. For example, light source device 1 is used in endoscopic lighting systems, on-vehicle lighting devices, projectors, and the like. Here, the primary light is excitation light, for example, laser light. Light source device 1 may be used in downlights, spotlights, and the like. For example, light source device 1 is connected to a connector disposed in an optical fiber to form a lighting system. In light source device 1, the primary light is emitted to the other surface (surface close to optical member 30) of fluorescent member 40, and wavelength-converted light (fluorescent light) having a converted wavelength is emitted from one surface of fluorescent member 40, thus illuminating the surroundings thereof.

Light source device 1 includes casing 10, a plurality of excitation light sources 20, optical member 30, fluorescent member 40, sensor 50, controller 60, light guide members 45*a* and 45*b*, filters 51*a* and 52*a*, and driving circuit 90.

[Casing 10]

Casing 10 is a bottomed tubular accommodating body extending from one side (right in the drawing) to the other side (left in the drawing). Casing 10 includes housing 11, support cover 12, first support 13, second support 14, and third support 15.

Housing 11 is a bottomless tubular case, and has openings at one end and the other end to define space K. Housing 11 accommodates optical member 30 inside space K.

Support cover 12 faces optical member 30, supports a plurality of excitation light sources 20, and closes the opening at the other end of housing 11.

First support 13 is disposed on the one side with respect to housing 11, and is fixed to housing 11. First support 13 includes through hole 13*a* extending from a surface facing the other surface of fluorescent member 40. Primary light, which is emitted from each of excitation light sources 20 and transmits through optical member 30, passes through through hole 13*a*. For this reason, through hole 13*a* penetrates through first support 13 from the one side to the other side, and is disposed on center line O. To be noted, for example, through hole 13*a* may have an inner surface coated with a dielectric multi-layered coating which reflects secondary light with high efficiency, or a light pipe, a glass rod, or the like may be disposed in through hole 13*a*.

Second support 14 is disposed on the one side with respect to first support 13, and is fixed to first support 13 or fixed to housing 11 such that first support 13 is interposed. Thereby, second support 14 overlays first support 13. Second support 14 includes through hole 14*a* extending from a surface facing the one surface of fluorescent member 40. Secondary light, which contains the primary light subjected to diffuse transmission in fluorescent member 40 and the wavelength-converted light emitted from fluorescent member 40, passes through through hole 14*a*. For this reason, through hole 14*a* penetrates through the one side to the other side of second support 14, and is disposed on center line O to correspond to center line O of through hole 13*a*. To be noted, for example, through hole 14*a* may have an inner surface coated with a dielectric multi-layered coating which reflects the secondary light with high efficiency, or a light pipe, a glass rod, or the like may be disposed in through hole 14*a*.

At least one of first support 13 or second support 14 includes recess 10*a* for disposing and accommodating fluorescent member 40. Specifically, recess 10*a* may be disposed on the other end surface of second support 14. Alternatively, recess 10*a* may be disposed on both one end surface of first support 13 and the other end surface of second support 14, that is, extending from first support 13 to second support 14. In the present embodiment, recess 10*a* for disposing fluorescent member 40 is disposed on the one end surface of first support 13.

Recess 10*a* is connected to through holes 13*a* and 14*a*, and is disposed on center line O of optical member 30. When fluorescent member 40 is disposed in recess 10*a*, first support 13 and second support 14 support fluorescent member 40 such that fluorescent member 40 is sandwiched between first support 13 and second support 14. Specifically, first support 13 and second support 14 support fluorescent member 40 such that the other surface of plate-like fluorescent member 40 is orthogonal to center line O.

At least one of first support 13 or second support 14 includes guide 13*b* disposed between light conversion member 41 and sensor 50, for guiding the secondary light to sensor 50. In the present embodiment, at least one of first support 13 or second support 14 includes first guide 13*b*1 which is guide 13*b* extending from recess 10*a* to first sensor 51, and second guide 13*b*2 which is guide 13*b* extending recess 10*a* to second sensor 52.

First guide 13*b*1 and second guide 13*b*2 are holes or grooves for communicating between light conversion member 41 and sensor 50. Specifically, first guide 13*b*1 and second guide 13*b*2 may be formed on the other end surface of second support 14. Alternatively, first guide 13*b*1 and second guide 13*b*2 may be formed on both of the one end surface of first support 13 and the other end surface of second support 14, that is, extending from first support 13 to second support 14. In the present embodiment, first guide 13*b*1 and second guide 13*b*2 are connected to recess 10*a*, and extend in a direction intersecting orthogonal to center line O. In the present embodiment, first guide 13*b*1 and second guide 13*b*2 are grooves formed in first support 13.

The secondary light passes through guide 13*b*, the secondary light containing the primary light subjected to diffusion transmission through fluorescent member 40 and the wavelength-converted light obtained by converting the wavelength of the primary light by fluorescent member 40. In other words, leaking light of the secondary light emitted from light conversion member 41 is emitted in guide 13*b*.

In the light paths of light including the primary light and the secondary light, the light path of the secondary light passing through guide 13*b* crosses (in the present embodiment, is orthogonal to) the light path from through hole 13*a* to through hole 14*a*.

To be noted, for example, guide 13*b* may have an inner surface coated with a dielectric multi-layered coating which reflects the secondary light with high efficiency, or a light pipe, a glass rod, or the like may be disposed in guide 13*b*. The secondary light after passing through guide 13*b* is emitted to the outside of casing 10.

First support 13 and second support 14 function as heat dissipating members for dissipating heat generated in the plurality of excitation light sources 20 and fluorescent member 40.

Although not illustrated, second support 14 includes a connection terminal disposed for connection to the optical fiber. The connection terminal is disposed to overlay through hole 14*a*, and allows the secondary light after passing through through hole 14*a* to pass therethrough. The optical fiber includes a light guide member which transmits the secondary light, a connector mechanically connected to the connection terminal of second support 14, and a ferrule which is a positioning part which holds the light guide member to face fluorescent member 40.

Third support 15 is disposed on the other surface side of support cover 12. Third support 15 holds substrates of controller 60, driving circuit 90, and excitation light sources 20. Third support 15 is connected to first support 13 with a fastening member such as a screw to be fixed to housing 11.

In the present embodiment, support cover 12, first support 13, and second support 14 are connected to housing 11 with a fastening member such as a screw to be fixed to housing

11. Thus, housing 11 is disposed such that housing 11 is sandwiched between support cover 12 and first support 13 and second support 14.

[Excitation Light Source 20]

Each of excitation light sources 20 includes a semiconductor light-emitting element lens, and emits the primary light substantially collimated. Excitation light sources 20 are mounted on substrate 21 such that the optical axes of their emitting primary light are approximately parallel. The plurality of excitation light sources 20 are arranged on the same surface of substrate 21. In other words, the plurality of excitation light sources 20 are arranged on optical member 30 side of substrate 21.

Each of excitation light sources 20 is disposed to allow light to enter first surface 31 of optical member 30. The plurality of excitation light sources 20 each emit the primary light to optical member 30, thereby allowing rays of the primary light to enter the other surface of fluorescent member 40 through optical member 30 and the like. Specifically, the plurality of excitation light sources 20 and substrate 21 are fixed to support cover 12 such that the optical axis of the primary light crosses first surface 31 of optical member 30. The plurality of excitation light sources 20 are thermally coupled to support cover 12 via substrate 21. The optical axis of the primary light is the optical axis of the primary light emitted from each excitation light source 20, and is the optical axis approximately parallel to a direction along the one side to the other side.

Although eight excitation light sources 20 are used in the present embodiment, seven or less or nine or more excitation light sources 20 may be used. In the present embodiment, four excitation light sources 20 may be used. In the present embodiment, the primary light emitted from each excitation light source 20 is light having a predetermined wavelength in the wavelength bandwidth ranging from violet to blue light. In the present embodiment, each of excitation light sources 20 outputs light in watt (e.g., 1 W or more).

Although eight excitation light sources 20 are used as a set of excitation light sources 20 in the present embodiment, sets of excitation light sources 20 may be used. In this case, the number of optical members 30 disposed one-to-one corresponds to the number of sets of excitation light sources 20.

Each excitation light source 20 is configured of a semiconductor laser, for example, an InGaN laser diode. Each excitation light source 20 may be a semiconductor laser or a light emitting diode (LED) having a different wavelength as long as the primary light emitted from excitation light source 20 can excite light conversion member 41 in fluorescent member 40.

The outputs of the primary light emitted from excitation light sources 20 are controlled by driving circuit 90. The primary light emitted from excitation light sources 20 may contain laser light components which do not excite fluorescent member 40.

[Optical Member 30]

Optical member 30 is a light-transmissive convex lens. Optical member 30 converges rays of the primary light emitted from the plurality of excitation light sources 20, and allows the converged primary light to enter the other surface of fluorescent member 40.

Optical member 30 is disposed inside housing 11 to cross the optical axes of the primary light emitted from excitation light sources 20. Specifically, optical member 30 is disposed inside housing 11 such that rays of the primary light emitted from the plurality of excitation light sources 20 directly enter optical member 30, that is, the optical axes of excitation light sources 20 are approximately parallel to center line O of optical member 30. Center line O of optical member 30 is a line segment (main axis) which passes through the center of optical member **30*a* and is approximately vertical to first surface 31 and second surface 32 of optical member 30**.

Optical member 30 includes first surface 31 and second surface 32. Optical member 30 is a convex lens where first surface 31 is a curved surface and second surface 32 is a flat surface. First surface 31 is a surface facing the plurality of excitation light sources 20, and is the surface which rays of the primary light emitted from the plurality of excitation light sources 20 directly enter. Second surface 32 is a surface opposite to first surface 31, and is the surface from which the rays of the primary light after entering first surface 31 and transmitting through the inside of optical member 30 are emitted. In the present embodiment, first surface 31 is a semi-spherical surface.

[Fluorescent Member 40]

Fluorescent member 40 is a phosphor (optical body) which converts the primary light into wavelength-converted light after the rays of the primary light are emitted from the plurality of excitation light sources 20 and converged by optical member 30, and emits the secondary light that contains the primary light and the wavelength-converted light obtained by converting the wavelength of at least part of the primary light. Specifically, fluorescent member 40 is in a plate-like form allowing emission of the wavelength-converted light and diffusion and transmission of the primary light converged by optical member 30.

Fluorescent member 40 converts the wavelength of the primary light after entering the other surface of fluorescent member 40, and emits the resulting light from the one surface thereof. More specifically, the primary light converged by optical member 30 enters the other surface of fluorescent member 40. At least part of the primary light after entering the other surface of fluorescent member 40 is subjected to wavelength conversion, and is emitted from the one surface of fluorescent member 40.

Fluorescent member 40 is disposed between first support 13 and second support 14 in a state where fluorescent member 40 is in contact with first support 13 and second support 14. Fluorescent member 40 is disposed in and fixed to recess **10*a* disposed in casing 10 such that the other surface of fluorescent member 40 crosses center line O of optical member 30. In other words, fluorescent member 40 is disposed to close the opening on the one side of through hole 13*a* of first support 13 and close the opening on the other side of through hole 14*a* of second support 14. Fluorescent member 40 is disposed between first sensor 51 and second sensor 52 and between through hole 13*a* and through hole 14*a***.

Fluorescent member 40 is a flat plate. In the present embodiment, fluorescent member 40 includes light transmission portion 42 and light conversion member 41 (phosphor layer), for example. Although not illustrated, fluorescent member 40 may include an anti-reflective (AR) layer and a reflective film. In this case, fluorescent member 40 is a multi-layered structure of the AR layer, light transmission portion 42, the reflective film, and light conversion member 41 laminated in this order.

Light transmission portion 42 is a light-transmissive substrate, and is configured with sapphire or the like, for example. Although a sapphire substrate having high thermal conductivity is used in light transmission portion 42, any other substrate can be used without limitation. As light transmission portion 42, a transparent substrate such as glass may be used instead of the sapphire substrate.

Light conversion member 41 is a wavelength converting member which emits the secondary light that contains the primary light and the wavelength-converted light obtained by converting the wavelength of at least part of the primary light. Specifically, light conversion member 41 emits the wavelength-converted light by converting the wavelength of part of the primary light converged by optical member 30, and emits the secondary light composed of the primary light and the wavelength-converted light due to diffusion transmission and passing of the remaining part of the primary light not subjected to wavelength conversion.

Light conversion member 41 contains the phosphor which emits the wavelength-converted light obtained by converting the wavelength of at least part of the primary light, and the phosphor is dispersed in and held by a binder which is a transparent material made of a ceramic, such as glass, or a silicone resin. Light conversion member 41 is, for example, a YAG (Yttrium Aluminum Garnet)-based phosphor, a CASN-based phosphor, an SCASN-based phosphor, or a BAM (Ba, Mg, Al)-based phosphor, which can be appropriately selected depending on the type of the primary light. The binder is not limited to ceramics and silicone resins, and other transparent materials such as transparent glass may be used.

Light conversion member 41 may be a red phosphor, a green phosphor, or a blue phosphor, for example, and may emit wavelength-converted light of red, green, or blue depending on the type of the primary light. In this case, the wavelength-converted light may be white light obtained by mixing red, green, and blue light components.

In the present embodiment, for example, light conversion member 41 emits pseudo white wavelength-converted light which is a combination of green to yellow wavelength-converted light obtained by absorbing the blue light component which is part of the primary light emitted from excitation light sources 20 and the blue light component which is the primary light emitted therefrom without being absorbed by light conversion member 41. When excitation light sources 20 emit blue primary light, light conversion member 41 may contain several types of phosphors which absorb part of the blue primary light and convert the wavelength to that of green to yellow light.

Light conversion member 41 has thermal quenching properties that an increase in temperature thereof reduces conversion efficiency. Because loss accompanied by wavelength conversion is turned into heat, it is important to ensure heat dissipating properties of light conversion member 41. To facilitate dissipation of heat generated in light conversion member 41 through a sapphire substrate or the like, preferably, fluorescent member 40 is in contact with first support 13 and second support 14.

The AR layer allows the primary light to transmit through light transmission portion 42 with high efficiency, and can increase light efficiency. The reflective film is a dichroic mirror such as a dielectric multi-layered film, where the primary light in the wavelength bandwidth ranging from blue to violet colors transmits through the reflective film and light in a wavelength bandwidth other than the wavelength bandwidth ranging from blue to violet colors is reflected from the reflective film. In other words, the reflective film enables transmission of the primary light with high efficiency, and can reflect the wavelength-converted light.

[Light Guide Members 45*a*, 45*b*]

Figure 3:
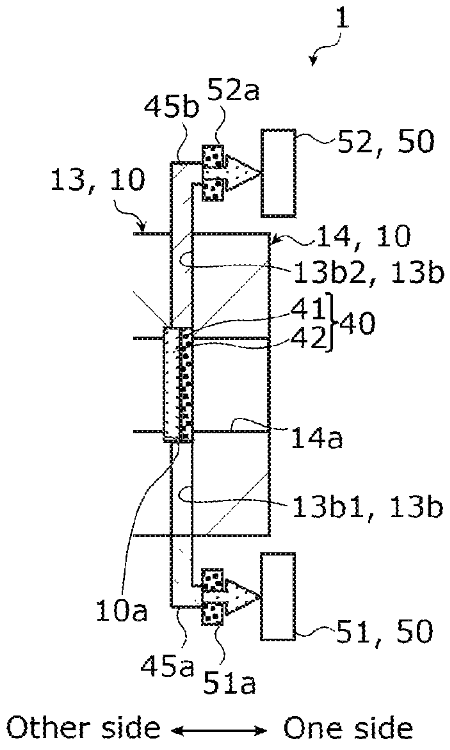
FIG. 3 is a cross-sectional partial view illustrating another light guide member and the like in the light source device according to the embodiment.

Light guide member 45*a* is disposed between first sensor 51 and the opening of first guide 13*b*1, and light guide member 45*b* is disposed between second sensor 52 and the opening of second guide 13*b*2. Light guide members 45*a* and 45*b* illustrated in FIG. 1 are light pipes, for example. In the present embodiment, as illustrated in FIG. 3, light guide members 45*a* and 45*b* are disposed outside casing 10. At least part of light guide members 45*a* and 45*b* may be disposed inside casing 10. FIG. 3 is a cross-sectional partial view illustrating another light guide member 45*b* and the like in light source device 1 according to the embodiment. Light guide members 45*a* and 45*b* illustrated in FIG. 3 are light-transmissive optical fibers. As illustrated in FIG. 3, first sensor 51 and second sensor 52 are arranged on the one side with respect to fluorescent member 40. In this case, light guide member 45*a* may be partially curved to extend to first sensor 51, and light guide member 45*b* may be partially curved to extend to second sensor 52.

Light guide members 45*a* and 45*b* guide the primary light and the wavelength-converted light to sensor 50. Specifically, light guide member 45*a* guides the secondary light, which is emitted from the opening of first guide 13*b*1, to first sensor 51 of sensor 50 through filter 51*a*. Light guide member 45*b* guides the secondary light, which is emitted from the opening of second guide 13*b*2, to second sensor 52 of sensor 50 through filter 52*a*. Light guide members 45*a* and 45*b* are optical fibers or light pipes, for example. Although light guide members 45*a* and 45*b* are arranged in the present embodiment, this is not an essential configurational requirement for light source device 1, and the light guide members need not be arranged.

[Sensor 50]

Sensor 50 detects the primary light and the wavelength-converted light. Sensor 50 includes a plurality of sensors including a sensor sensitive to the primary light and a sensor sensitive to the wavelength-converted light. Specifically, in the present embodiment, sensor 50 includes first sensor 51 which is a sensor sensitive to the primary light, and second sensor 52 which is a sensor sensitive to the wavelength-converted light. First sensor 51 and second sensor 52 are one example of the sensor.

Sensor 50 is disposed on the secondary light emission-side of light conversion member 41. Specifically, first sensor 51 in sensor 50 is disposed opposite to the opening of first guide 13*b*1 with filter 51*a* interposed therebetween to receive the secondary light which transmits through fluorescent member 40 and is emitted from the opening of first guide 13*b*1. Second sensor 52 in sensor 50 is disposed opposite to the opening of second guide 13*b*2 with filter 52*a* interposed therebetween to receive the secondary light which transmits through fluorescent member 40 and is emitted from the opening of second guide 13*b*2. In other words, first sensor 51 is disposed in a position in a longitudinal direction extending from fluorescent member 40 to first guide 13*b*1, and second sensor 52 is disposed in a position in a longitudinal direction extending from fluorescent member 40 to second guide 13*b*2. Thus, first sensor 51 and second sensor 52 are arranged in approximately a direction intersecting approximately orthogonal to the direction of the primary light and the secondary light which travel from the plurality of excitation light sources 20 to through hole 14*a*.

In the present embodiment, sensor 50 is of a transmissive type that receives the secondary light which transmits through fluorescent member 40.

Sensor 50 detects an anomaly of fluorescent member 40. Specifically, first sensor 51 and second sensor 52 detect an anomaly of light conversion member 41 in fluorescent member 40 by detecting the secondary light emitted from fluorescent member 40. Here, the anomaly of light conversion member 41 means breakage of fluorescent member 40, larger output of the primary light than the output of the wavelength-converted light caused by degradation of fluorescent member 40, leakage of the primary light, and the like. First sensor 51 outputs a first signal for detecting the anomaly to controller 60, the first signal being a signal indicating the primary light, and second sensor 52 outputs a second signal to controller 60, the second signal being a signal indicating the wavelength-converted light.

Sensor 50 is configured of a photodiode and a light-receiving element such as an imaging element which can receive a signal. Sensor 50 is connected to an amplifying circuit for reception of the signal in the light-receiving element and a circuit which converts the received analog signal to a digital signal.

In the present embodiment, sensor 50 is disposed outside casing 10. Such a configuration in which sensor 50 is disposed away from a heat source such as excitation light source 20 can ensure prevention of degradation of sensor 50 and detection precision.

[Controller 60]

Controller 60 obtains a first signal which is a signal indicating the primary light detected by sensor 50, and a second signal which is a signal indicating the wavelength-converted light detected by sensor 50. Controller 60 determines an operation safety parameter based on the ratio of the output value (output voltage) of the first signal to the output value (output voltage) of the second signal.

Figure 4:
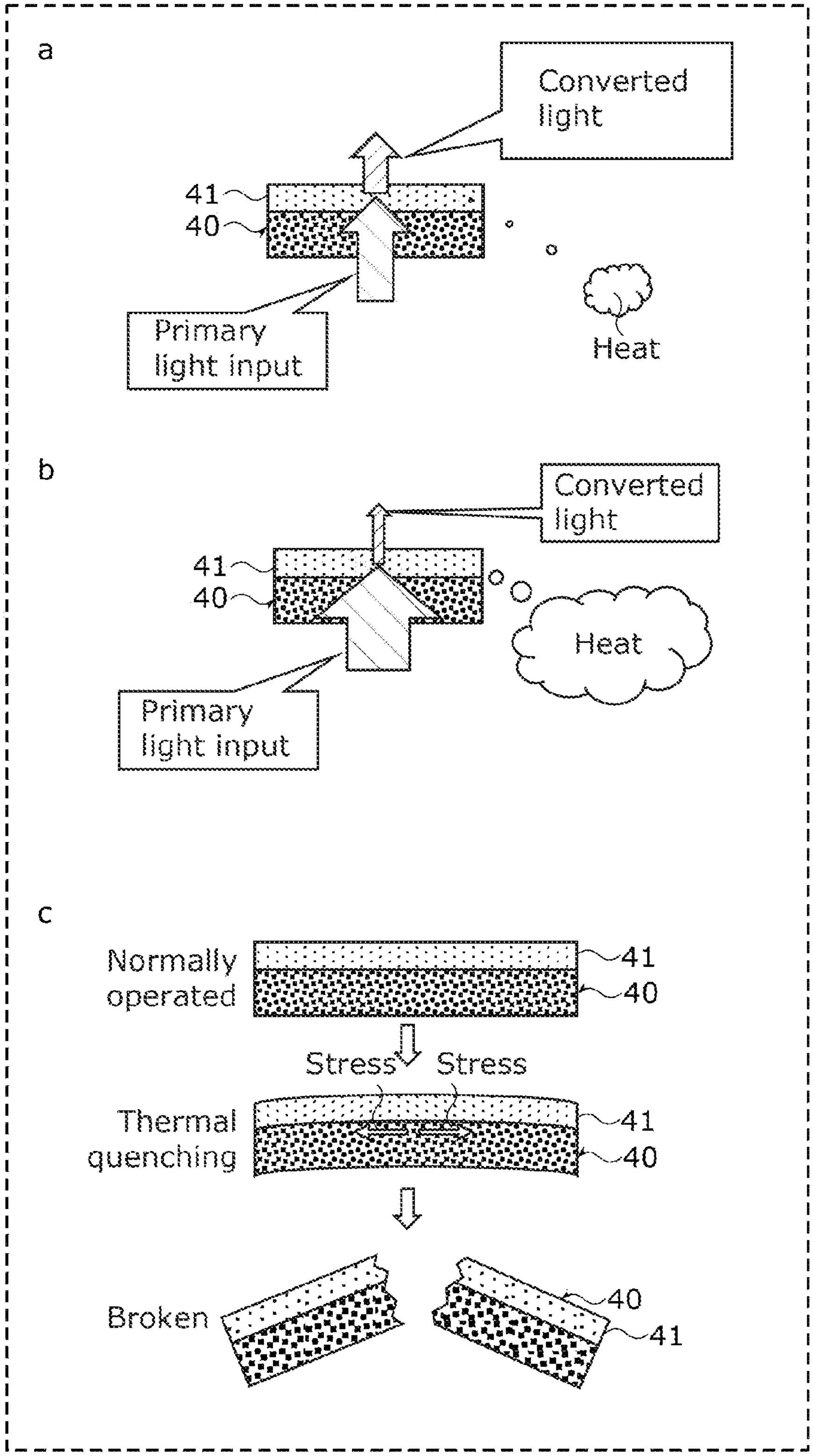
FIG. 4 is a diagram schematically illustrating the state where primary light continuously enters the light conversion member of the light source device.
Figure 5:
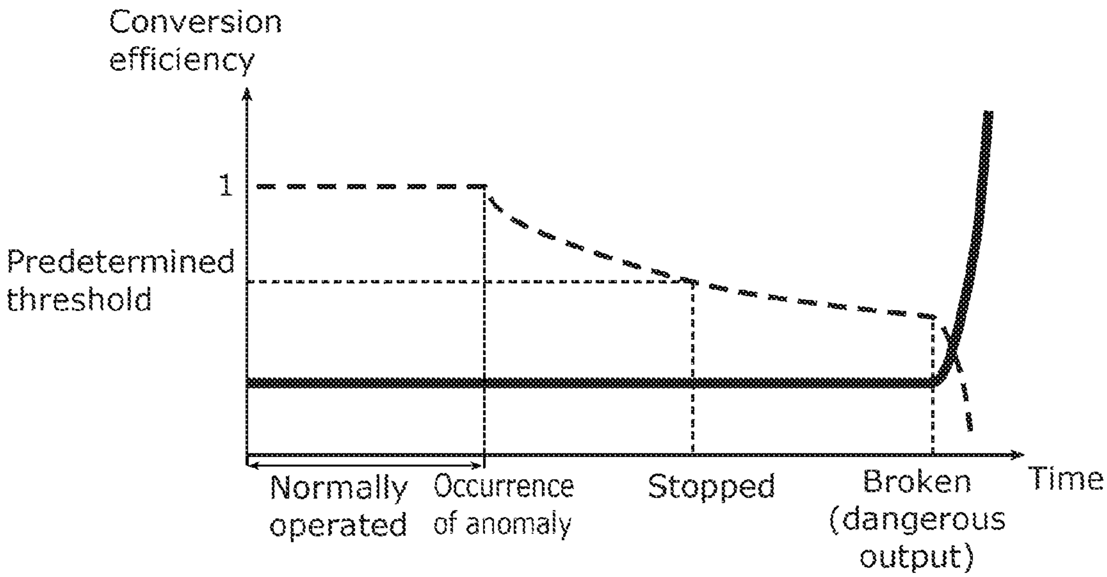
FIG. 5 is a diagram illustrating the relation between the conversion efficiency of the wavelength-converted light to the primary light and the time.

Here, the operation safety parameter will be described with reference to FIGS. 4 and 5. FIG. 4 is a diagram schematically illustrating the state where the primary light continuously enters light conversion member 41 in light source device 1. FIG. 5 is a diagram illustrating the relation between the conversion efficiency of the wavelength-converted light to the primary light and the time. The dashed line in FIG. 5 indicates the conversion efficiency of the output of the wavelength-converted light to the output of the primary light which changes as the time passes, and the solid line in FIG. 5 indicates the output of light emitted from light source device 1 as the time passes.

As illustrated in a, b, and c of FIG. 4, when light conversion member 41 converts the primary light to the wavelength-converted light, loss accompanied by conversion of the wavelength changes to heat. Thus, the temperature of light conversion member 41 increases as the time passes. However, as described above, light conversion member 41 has thermal quenching properties that an increase in temperature leads to a reduction in conversion efficiency. For this reason, as illustrated in c of FIG. 4, during thermal quenching, stress is applied to fluorescent member 40 to deform fluorescent member 40. Thereby, as illustrated by the dashed line in FIG. 5, after a predetermined time passes, an anomaly may occur in fluorescent member 40 due to stress, and may cause cracks in fluorescent member 40 in some cases. If the primary light continuously enters fluorescent member 40, stress is continuously applied to fluorescent member 40, which results in breakage of fluorescent member 40 as illustrated in c of FIG. 4 and by the dashed line in FIG. 5. If so, the primary light may leak from casing 10 in some cases. For this reason, to avoid such events, the state of degradation of light conversion member 41 should be predicted in advance.

Figure 6:
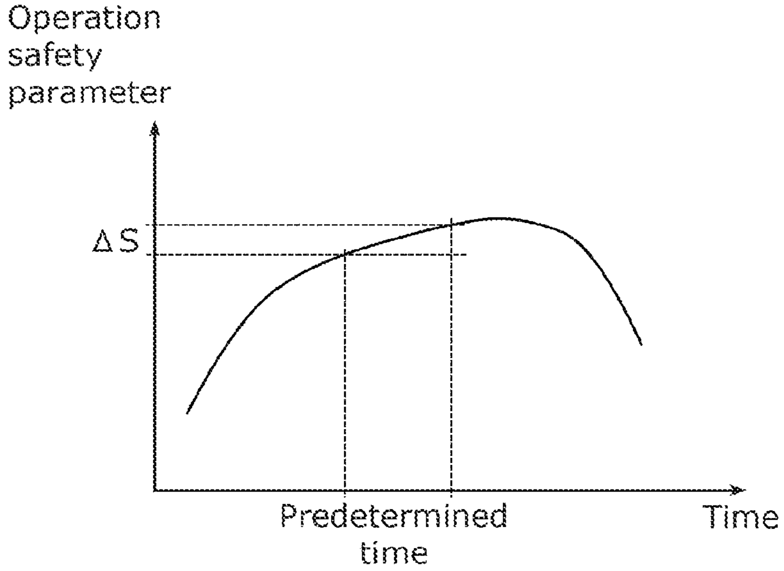
FIG. 6 is a diagram illustrating the relation between the operation safety parameter and the time.

Thus, light source device 1 is operated safe by setting a predetermined threshold as the reference value for determining an anomaly, as illustrated in FIG. 5, or providing amount of change ΔS of the operation safety parameter from the operation safety parameter during normal operation in a predetermined time, as illustrated in FIG. 6, in a period from occurrence of an anomaly in fluorescent member 40 to breakage of fluorescent member 40. In the example illustrated by the dashed line in FIG. 5, a value higher than or equal to the predetermined threshold is the operation safety parameter. FIG. 6 is a diagram illustrating the relation between the operation safety parameter and the time.

Controller 60 controls excitation light source 20 based on the operation safety parameter with respect to at least one predetermined threshold (comparison between the predetermined threshold and the operation safety parameter) or amount of change ΔS of the operation safety parameter from the operation safety parameter during normal operation. Specifically, controller 60 determines the presence/absence of an anomaly in fluorescent member 40, i.e., light conversion member 41 based on the first signal and the second signal obtained from first sensor 51 and second sensor 52, respectively. More specifically, when the operation safety parameter indicates the conversion efficiency of the output of the wavelength-converted light to the output of the primary light and the operation safety parameter is lower than or equal to the predetermined threshold, controller 60 determines that light conversion member 41 has an anomaly. When the operation safety parameter indicates the proportion of the output of the primary light to the output of the wavelength-converted light (1/conversion efficiency) and the operation safety parameter is higher than or equal to the predetermined threshold, controller 60 determines that light conversion member 41 has an anomaly. When the operation safety parameter indicates amount of change ΔS of the operational safety parameter from the parameter during normal operation and amount of change ΔS exceeds the predetermined value, controller 60 determines that light conversion member 41 has an anomaly.

For example, when controller 60 determines based on the first signal and the second signal that fluorescent member 40 has an anomaly, controller 60 may stop driving of the plurality of excitation light sources 20, or may inform the surroundings of information indicating that fluorescent member 40 has an anomaly. For example, when controller 60 determines that fluorescent member 40 has an anomaly and the operation safety parameter is lower than the reference value for determining an anomaly (corresponding to the case where it is lower than or equal to the threshold) or the operation safety parameter exceeds the reference value for determining an anomaly (corresponding to the case where it is higher than or equal to the threshold), controller 60 stops electricity fed to the plurality of excitation light sources 20 by controlling driving circuit 90. When controller 60 determines based on the first signal and the second signal that fluorescent member 40 has no anomaly, controller 60 need not inform at all, or may inform the surroundings of the information indicating fluorescent member 40 is normal. Thus, controller 60 can monitor the state of fluorescent member 40 in light source device 1.

[Filters **51*a*, 52*a***]

Filter **51*a* is disposed between first sensor 51 and the opening of first guide 13*b*1, and filter 52*a* is disposed between second sensor 52 and the opening of second guide 13*b*2. Filter 51*a* disposed between first sensor 51 and the opening of first guide 13*b*1 may absorb and block light other than the primary light, such as light in the wavelength bandwidth other than that of blue light. Filter 52*a* disposed between second sensor 52 and the opening of second guide 13*b*2 may absorb and block light other than the wavelength-converted light, such as light in the wavelength bandwidth of blue light. Such a configuration can block the light other than the light in a wavelength bandwidth to be detected by sensor 50, therefore improving the SN ratio for detecting the anomaly of light conversion member 41 by sensor 50**.

[Driving Circuit 90]

Driving circuit 90 is electrically connected to a power system with a power line or the like to feed electricity to the plurality of excitation light sources 20 and sensor 50. Driving circuit 90 drives and controls the outputs of excitation light sources 20 such that excitation light sources 20 each emit the primary light. Driving circuit 90 stops driving of each of excitation light sources 20 by control by controller 60.

Driving circuit 90 may have a function to modulate the primary light emitted from each of excitation light sources 20. Driving circuit 90 may be configured of an oscillator which drives each of excitation light sources 20 based on a pulse signal.

<Operation of Light>

In such light source device 1, rays of primary light emitted from the plurality of excitation light sources 20 enter first surface 31 of optical member 30, transmit through optical member 30, and are emitted from second surface 32. The rays of the primary light transmit through through hole 13*a* while they are being converged, and enter the other surface of fluorescent member 40. The primary light after entering the other surface of fluorescent member 40 is partially absorbed by light conversion member 41, and the wavelength-converted light is emitted. The remaining part of the primary light transmits through fluorescent member 40 without the wavelength being converted. The secondary light that contains the wavelength-converted light and the primary light emitted from fluorescent member 40 transmits through through hole 14*a*, and is emitted to the outside of light source device 1. Then, the secondary light enters an optical fiber, is guided through the optical fiber to its distal end, and is emitted from the distal end. The light emitted from the distal end can illuminate a predetermined place. Part of the secondary light that contains the wavelength-converted light and the primary light emitted from fluorescent member 40 passes through first guide 13*b*1 and second guide 13*b*2, and enters first sensor 51 and second sensor 52 via filters 51*a* and 52*a*. Thereby, the wavelength-converted light and the primary light are detected.

<Processing Operation of Controller 60>

The processing operation of controller 60 in light source device 1 will be described with reference to FIG. 7 and the like.

Figure 7:
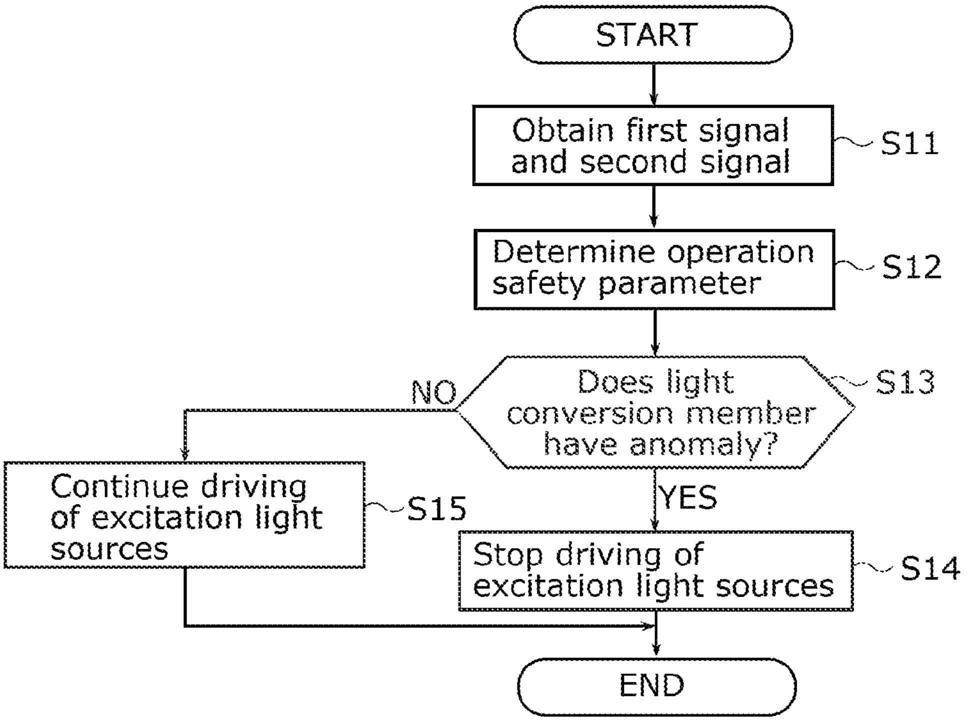
FIG. 7 is a flowchart illustrating a processing operation to determine whether the wavelength converting member in the light source device has an anomaly.

FIG. 7 is a flowchart illustrating the processing operation to determine whether the wavelength converting member in the light source device has an anomaly.

As illustrated in FIGS. 2 and 7, first sensor 51 outputs the first signal to controller 60, the first signal being a signal indicating the primary light, and second sensor 52 outputs the second signal to controller 60, the second signal being a signal indicating the wavelength-converted light. Controller 60 obtains the first signal detected by sensor 50, the first signal being a signal indicating the primary light, and the second signal detected by sensor 50, the second signal being a signal indicating the wavelength-converted light (S11).

Controller 60 determines the operation safety parameter based on the ratio of the output value of the first signal to that of the second signal (S12).

Based on information indicating the primary light and information indicating the wavelength-converted light obtained from first sensor 51 and second sensor 52, respectively, controller 60 determines whether fluorescent member 40 or light conversion member 41 has an anomaly. In other words, when the operation safety parameter is lower than or equal to the predetermined threshold, when the operation safety parameter is higher than or equal to the predetermined threshold, when amount of change ΔS exceeds the predetermined value, controller 60 determines that light source device 1 has an anomaly. Specifically, when the operation safety parameter indicates the conversion efficiency of the output of the wavelength-converted light to the output of the primary light and is lower than or equal to the predetermined threshold, when the operation safety parameter indicates the proportion of the output of the primary light to the output of the wavelength-converted light and is higher than or equal to the predetermined threshold, or when the operation safety parameter indicates amount of change ΔS to the operation safety parameter during normal operation and exceeds the predetermined value, controller 60 determines that light conversion member 41 has an anomaly.

When controller 60 determines that light conversion member 41 has an anomaly (YES in S13), controller 60 stops electricity fed to the plurality of excitation light sources 20 by controlling driving circuit 90 to stop driving of the plurality of excitation light sources 20 (S14). Then, controller 60 ends the processing operation.

When controller 60 determines that light conversion member 41 has no anomaly (NO in S13), controller 60 causes driving of the plurality of excitation light sources 20 to be continued (S15). Then, controller 60 ends the processing operation.

[Effects]

Next, effects of light source device 1 according to the present embodiment will be described.

As described above, light source device 1 according to the present embodiment includes at least one excitation light source 20 which emits primary light, light conversion member 41 which emits secondary light that contains the primary light and wavelength-converted light obtained by converting the wavelength of at least part of the primary light, sensor 50 which detects the primary light and the wavelength-converted light, and controller 60 which obtains a first signal which is a signal indicating the primary light detected by sensor 50 and a second signal which is a signal indicating the wavelength-converted light detected by sensor 50. Controller 60 determines an operation safety parameter based on a ratio of the output value of the first signal to the output value of the second signal, and controls at least one excitation light source 20 based on an operation safety parameter with respect to a predetermined threshold or an amount of change ΔS of the operation safety parameter from the operation safety parameter during normal operation.

For example, in some cases, breakage of the light conversion member cannot be detected in advance when the breakage is small breakage in terms of the time derivative value of the amount of change in the output signal from the sensor, that is, the light conversion member slowly degrades. In particular, in the case where the primary light emitted from the excitation light source has a high output, immediate stop of driving of the excitation light source is required when the light conversion member is broken.

Thus, according to the present embodiment, by determining the operation safety parameter, an anomaly of light conversion member 41 can be detected using the operation safety parameter with respect to a predetermined threshold or amount of change ΔS of the operation safety parameter from the operation safety parameter during normal operation.

Therefore, light source device 1 can precisely detect small breakage of light conversion member 41.

In particular, when light conversion member 41 has an anomaly, controller 60 can stop driving of excitation light source 20, and when light conversion member 41 has no anomaly, controller 60 can continue driving of excitation light source 20. For this reason, light source device 1 can be used while its safety is ensured.

In particular, control of excitation light source 20 by comparison between the operation safety parameter and the predetermined threshold leads to faster determination than in control of excitation light source 20 based on amount of change ΔS of the operation safety parameter from the operation safety parameter during normal operation, and thus excitation light source 20 can be controlled faster. This further facilitates ensuring of safety of light source device 1.

In light source device 1 according to the present embodiment, sensor 50 is disposed on a secondary light emission-side of light conversion member 41.

For example, when the sensor is disposed on the excitation light source side, light returning from the light conversion member to the excitation light source side can also be detected. In this case, detection of a small light quantity is needed. For this reason, small breakage of the light conversion member cannot be sufficiently detected in some cases. However, according to the present embodiment, the S/N ratio can be ensured by detecting part of the secondary light emitted from light conversion member 41. Thus, small breakage of the light conversion member can be precisely detected.

In light source device 1 according to the present embodiment, controller 60 determines that the light conversion member has an anomaly when the operation safety parameter is lower than or equal to the predetermined threshold, determines that the light conversion member has an anomaly when the operation safety parameter is higher than or equal to the predetermined threshold, or determines that light conversion member 41 has an anomaly when amount of change ΔS exceeds the predetermined value.

In such a configuration, using the operation safety parameter, it can be precisely determined whether light conversion member 41 has an anomaly.

Light source device 1 according to the present embodiment includes casing 10 which accommodates light conversion member 41. In casing 10, guide 13*b* is disposed between light conversion member 41 and sensor 50, for guiding the secondary light to sensor 50.

In such a configuration, because the secondary light directly emitted from light conversion member 41 can be guided to sensor 50, sensor 50 can precisely detect the primary light and the wavelength-converted light.

In light source device 1 according to the present embodiment, guide 13*b* is a hole or a groove for communicating between light conversion member 41 and sensor 50.

In such a configuration, part of the secondary light emitted from light conversion member 41 can be extracted only by disposing a hole or a groove in casing 10.

Light source device 1 according to the present embodiment includes light guide members 45*a* and 45*b* which guides the primary light and the wavelength-converted light to sensor 50.

In such a configuration, because part of the secondary light emitted from light conversion member 41 can be guided to sensor 50 with loss reduced as much as possible, sensor 50 can precisely detect the primary light and the wavelength-converted light.

In light source device 1 according to the present embodiment, sensor 50 includes a plurality of sensors including a sensor sensitive to the primary light and a sensor sensitive to the wavelength-converted light.

In such a configuration, because the primary light and the wavelength-converted light can be detected, sensor 50 can precisely detect the primary light and the wavelength-converted light.

Modification of Embodiment

Unlike the light source device according to the embodiment, in the present modification, sensor 50 is configured of one sensor 53, only first guide 13*b*1 is disposed, and the filter on the second sensor side and the light guide member on the second sensor side are not arranged. The configurations of the present modification other than these are identical to those of the embodiment unless otherwise specified, and identical reference signs are given to identical configurations to omit their detailed descriptions.

Figure 8:
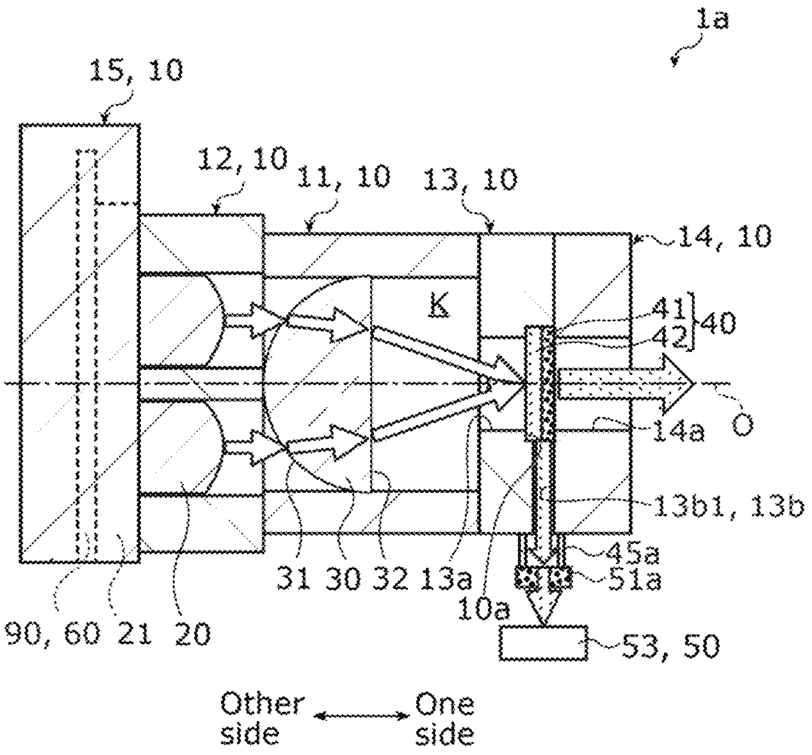
FIG. 8 is a cross-sectional view illustrating a light source device according to a modification of the embodiment.
Figure 9:
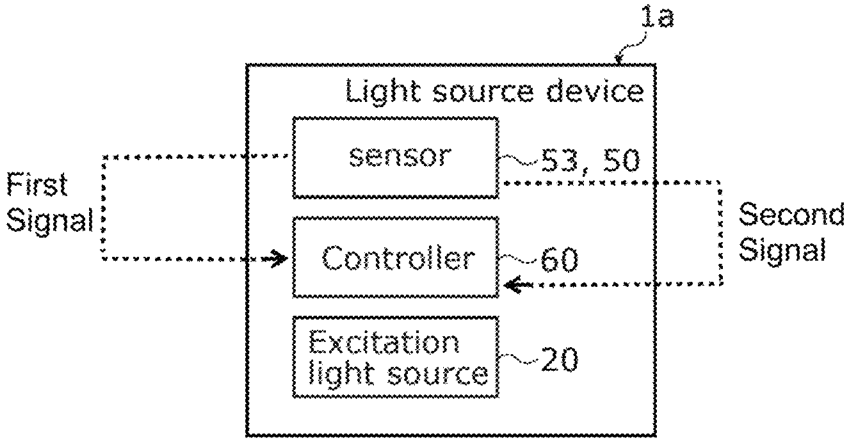
FIG. 9 is a block diagram illustrating the light source device according to the modification of the embodiment.

FIG. 8 is a cross-sectional view illustrating light source device 1*a* according to a modification of the embodiment. FIG. 9 is a block diagram illustrating light source device 1*a* according to the modification of the embodiment.

As illustrated in FIGS. 8 and 9, in the present modification, sensor 50 includes one sensor which detects both the primary light and the wavelength-converted light. For this reason, light source device 1*a* does not include the second sensor, the filter on the second sensor side, and the light guide member on the second sensor side, and not include the second guide which is guide 13*b* extending from recess 10*a* to the second sensor. Thus, sensor 53 in sensor 50 outputs the first signal as the signal indicating the primary light and the second signal as the signal indicating the wavelength-converted light to controller 60.

In such light source device 1*a* according to the present modification, sensor 50 includes one sensor 53 which detects both the primary light and the wavelength-converted light.

Such a configuration enables detection of the primary light and the wavelength-converted light with one sensor 53, and can suppress an increase in size of sensor 50. As a result, this can suppress an increase in size of light source device 1*a* and reduce the number of parts, avoiding an increase in production cost of light source device 1*a*.

OTHER MODIFICATIONS

Although the light source device according to the present disclosure has been described based on the embodiment above, the present disclosure is not limited to the embodiment. The present disclosure may also cover a variety of modifications of the embodiment conceived and made by persons skilled in the art without departing from the gist of the present disclosure.

For example, the components included in the light source device according to the embodiment are typically implemented as LSI which is an integrated circuit. These may be individually formed into single chips, or part or all of them may be formed into a single chip.

Formation of the integrated circuit is not limited to LSI, and may be implemented as a dedicated circuit or a general purpose processor. A field programmable gate array (FPGA) which can be programmed after production of LSI or a reconfigurable processor which allows a circuit cell in the LSI to be reconnected and reconfigured may be used.

In the embodiment above, the components may be configured of dedicated hardware, or may be implemented by executing software programs suitable for the components.

The components may also be implemented by a program executor, such as a CPU or a processor, which reads out and executes software programs recorded on a storage medium such as a hard disk or a semiconductor memory.

The numeric values used above are all illustrations for specific description of the present disclosure, and the embodiment according to the present disclosure is not limited to the illustrated numeric values.

The division of the functional blocks in the block diagram is one example, and a plurality of functional blocks may be implemented as a single functional block, a single functional block may be divided into several blocks, or part of functions may be distributed to another functional block. The functions of a plurality of functional blocks having similar functions may be processed in a parallel or time-sharing manner by single hardware or software.

The order of steps executed in the flowchart is an illustration for specific description of the present disclosure, and the steps may be executed in an order other than above. Part of the steps above may be executed simultaneously (in parallel) with another step.

The present disclosure also covers embodiments obtained by subjecting the embodiment above to a variety of modifications conceived by persons skilled in the art, and any combinations of the components and functions in the embodiment above without departing from the gist of the present disclosure.

The invention claimed is:

1. A light source device comprising:

at least one excitation light source that emits primary light;

a light conversion member that emits secondary light that contains the primary light and wavelength-converted light obtained by converting a wavelength of at least part of the primary light;

a sensor that detects the primary light and the wavelength-converted light; and a controller that obtains a first signal that is a signal indicating the primary light detected by the sensor, and a second signal that is a signal indicating the wavelength-converted light detected by the sensor, wherein the controller:

determines an operation safety parameter based on a ratio of an output value of the first signal to an output value of the second signal; and controls the at least one excitation light source by determining whether there is an anomaly in the light conversion member based on an amount of change of the operation safety parameter from an operation safety parameter during normal operation.

2. The light source device according to claim 1, wherein the sensor is disposed on a secondary light emission-side of the light conversion member.

3. The light source device according to claim 1, further comprising:

a casing that accommodates the light conversion member, wherein in the casing, a guide is disposed between the light conversion member and the sensor, for guiding the secondary light to the sensor.

4. The light source device according to claim 3, wherein the guide is a hole or a groove for communicating between the light conversion member and the sensor.

5. The light source device according to claim 1, further comprising:

a light guide member that guides the primary light and the wavelength-converted light to the sensor.

6. The light source device according to claim 1, wherein the sensor includes one sensor that detects both the primary light and the wavelength-converted light.

7. The light source device according to claim 1, wherein the sensor includes a plurality of sensors including a sensor sensitive to the primary light and a sensor sensitive to the wavelength-converted light.

8. The light source device according to claim 1, wherein the anomaly in the light conversion member correlates to a breakage of a fluorescent member that includes the light conversion member, degradation of the fluorescent member that results in an output of the primary light being larger than an output of the wavelength-converted light, and/or a leakage of the primary light.

* * * * *